United States Patent [19]

Dunn

[11] 4,144,908

[45] Mar. 20, 1979

[54] PIPE PLUGGING DEVICE AND METHOD

[76] Inventor: Edward E. Dunn, 1018 S. Cottage, Independence, Mo. 64050

[21] Appl. No.: 834,695

[22] Filed: Sep. 19, 1977

[51] Int. Cl.² ............................................ F16L 55/12
[52] U.S. Cl. ......................................................... 138/93
[58] Field of Search ..................................... 138/89-95

[56] References Cited

U.S. PATENT DOCUMENTS

| | | | |
|---|---|---|---|
| 2,927,609 | 3/1960 | Vander Lans | 138/93 |
| 3,091,259 | 5/1963 | Alessio | 138/90 |
| 3,593,749 | 7/1971 | Reardon | 138/93 |

Primary Examiner—Houston S. Bell

Attorney, Agent, or Firm—Fishburn, Gold & Litman

[57] ABSTRACT

A temporary plug for insertion into an open end of a conduit for gaseous fluids comprises an imperforate body having a fluid tight distensible member which is arranged to be enlarged by the introduction of fluid therein, and to seal against the inside surface of the conduit and plug the same. A flexible vent tube has one end connected with the plug body, and the other end positioned at a location remote from the open end of the conduit. The vent tube communicates the gaseous fluids with the atmosphere at the remote location to prevent leakage of the fluid in the vicinity of the plugged end of the conduit.

8 Claims, 3 Drawing Figures

PIPE PLUGGING DEVICE AND METHOD

BACKGROUND OF THE INVENTION

This invention relates to a pipe plugging arrangement and method, and in particular to a temporary plug for conduits carrying gaseous fluids.

The installation of fittings such as tees, elbows, and the like, in large conduits for gases is oftentimes conducted to repair or replace defective segments of line, and/or to provide new service entrances, branch pipes or extensions to an existing conduit. The installation of such fittings is typically accomplished by cutting a short segment of conduit from the line at the appropriate position, and fastening the fitting to the cut ends of the conduit by means such as bolted flanges. If the conduit is carrying a flammable gas or one which is highly toxic, such as natural gas, hydrogen, sulphur dioxide, or any one of a variety of well known flammable and/or poisonous vapors, the gas flow must be interrupted to prevent exposing the workmen to the hazard of an explosion and/or inhalation of the vapors. In very large conduits, even though the gas flow has been shut off at the selected location by a permanent valve, the line still contains a substantial amount of gas therein, and the cut ends of the line must be temporarily plugged during the installation of the fitting to prevent the gas from escaping. Leaking shut-off valves, as well as increasing temperatures in the line due to changing environmental conditions, causes a pressure build up in the cut line segments which can result in gas leaking about the plug and/or total dislodgment of the plug from the line.

Fittings for natural gas mains are typically installed in a similar manner, by cutting out a segment of the line at the cited location, positioning a plug into each of the cut ends, and welding an annularly shaped flange to each of the cut ends. The plugs are then withdrawn from the pipe, and a fitting having opposing end flanges which mate with the welded flanges is then positioned between the cut ends. The mating flanges are bolted together to form a sealed joint. The above described procedure can be quite hazardous if the natural gas leaks around one of the plugs during a thermally induced pressure build-up, particularly if the gas is exposed to a flame initiating source, such as an open welding flame, workman's smoking materials, contacting tools, and the like, and further is quite inefficient insofar as the fitting is attached to the pipe through two pairs of flanges.

The principal objects of the present invention are: to provide a pipe plugging device and method for safely and efficiently temporarily plugging a fluid carrying conduit; to provide such a device having an elongate vent tube for communicating the fluid with the environment at a point disposed remotely from an open end of the conduit; to provide such a device for safely installing fittings in conduits carrying flammable and/or toxic gaseous fluids; to provide such a device having a distensible portion for expanding and sealing against the interior surface of the conduit free end; to provide such a device having an elongate supply tube connected with the distensible portion for inserting and withdrawing the plug from a buried conduit; to provide such a device having a pressure release mechanism connected in the supply tube for preventing excess pressure in the distensible portion; to provide such a device having a valve and gauge in the supply line for supplying regulating, and releasing pressure to the distensible portion; to provide such a device which is shaped for threading the same through the free end of the fitting for a flangeless interconnection with the conduit; and to provide such a device which is economical to manufacture, efficient in use, capable of a long operating life, and particularly well adapted for the proposed use.

Further objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

Figure 1:
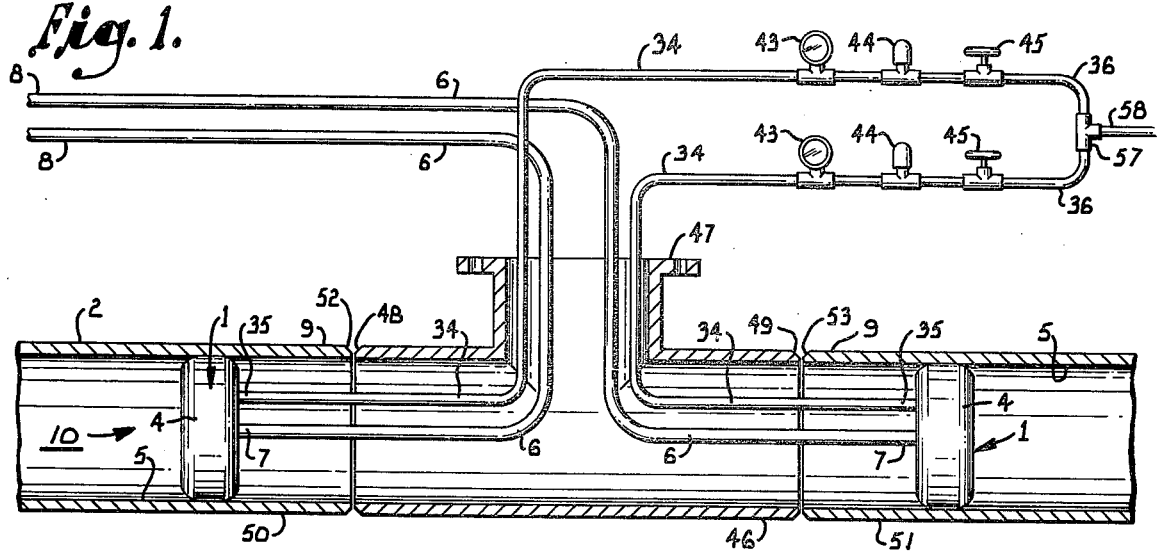
FIG. 1 is a partially schematic view of a pipe plugging device embodying the present invention, being shown in an expanded or inflated condition, and sealing a fluid conduit.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a temporary plug embodying the present invention, which is adapted for insertion into an open end of a fluid conduit 2. The plug 1 comprises an imperforate body 3 (FIG. 3) having a fluid type distensible member 4 arranged to be enlarged by the introduction of fluid therein, and to form a seal against the inside surface 5 of the conduit 2 and plug the same. A vent tube 6 has one end 7 connected with the plug body 3, and the other end 8 (FIG. 1) positioned at a location remote from the open end 9 of the conduit. The vent tube 6 communicates the gaseous fluids 10 with the atmosphere at the remote location to prevent leakage of the fluids at the conduit open end 9.

The plug body 3 comprises a pair of spaced apart side walls 14 and 15 (FIG. 3) having a circularly shaped periphery on which the distensible member 4 is mounted. The side walls 14 and 15 and the distensible portion 4 form a cavity 16 thereinbetween which communicates with a source of pressurized fluid (not shown) to inflate and deflate the distensible member 4. In the illustrated structure, the side walls 14 and 15 are flat and circular, and include an annularly shaped flange 17 and 18 respectively integrally connected with the peripheral edge thereof. The flange members 17 and 18 include interior and exterior surfaces 19 and 20, are opposed, and extend outwardly of the cavity 16 in a substantially aligned and coaxial fashion. A tubular fitting 21 is positioned laterally between the body side walls 14 and 15 and is rigidly attached to each and retains the side walls in a parallel and spaced apart relation. The illustrated fitting 21 has an end 22 fixedly attached to the exterior surface of side wall 14, is received in and extends through an axially centered aperture in the plug side wall 14, and through a mating and aligned aperture in the opposing side wall 15. In this example, the tubular member 21 is rigidly attached to each of the plug side walls 14 and 15 by welds 23. The free end of the tubular fitting 21 extends outwardly toward the open end 9 of the conduit 2, and is adapted for sealing interconnection with the end 7 of the vent tube 6. In this example, a threaded nut 24 is attached to the tubular fitting free end, and threadingly receives a mating fitting 25 therein.

The distensible member 4 is a substantially imperforate member attached around the marginal or peripherial edge of the plug body 3, and is flexible and resilient, whereby exposure to a pressurized fluid on the interior surface thereof expands the distensible portion outwardly to form a seal with the interior surface 5 of the fluid conduit 2. In this example, the distensible member 4 comprises a cylindrically shaped segment of flexible and resilient material having a medial portion 28, and inwardly turned ends 29 and 30 which are attached to the interior surface 19 of the associated plug body flange 17 and 18 respectively. The resilient material is preferably quite durable and resistant to chemical reactions with a variety of substances, and is a material such as synthetic rubber, vinyl, neopreme, or the like. The ends 29 and 30 of the distensible member are sealingly connected with the body flanges 17 and 18 by suitable means, and in the illustrated structure are bonded or adhered thereto.

Figure 3:
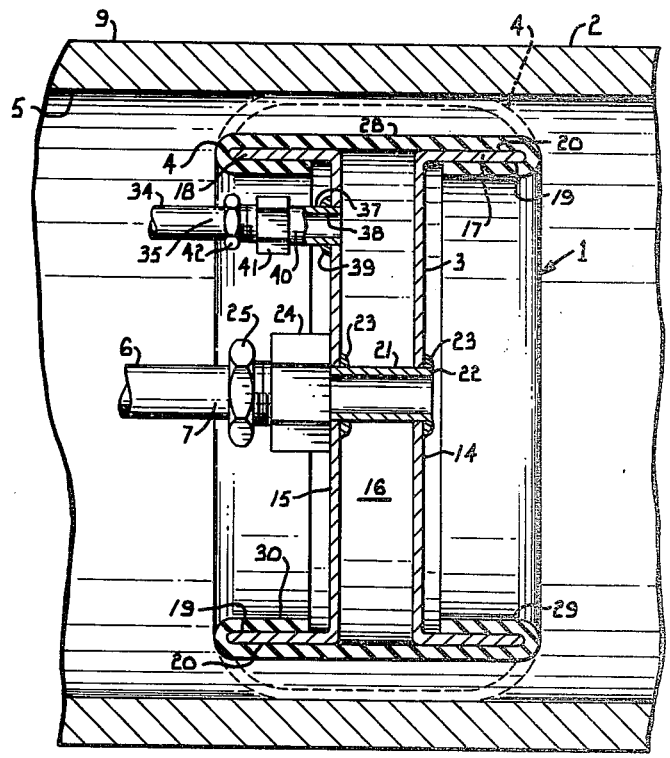
FIG. 3 is an enlarged vertical cross-sectional view of the pipe plugging device, shown in a deflated condition within the fluid conduit, an inflated condition thereof being shown in broken lines.

An elongate pressure supply tube 34 has one end 35 thereof connected with the plug body 3 and communicates with the body cavity 16. A second end 36 of the supply tube 34 is connected with a source of pressurized fluid (not shown) such as water, air, carbon dioxide, or the like. The tube 34 is preferably flexible and resilient to facilitate plug placement. As best illustrated in FIG. 3, in this example, a tubular member 37 has one end 38 thereof positioned in an opening disposed in the body side wall 15, and is fixedly attached thereto by means such as a weld 39. The other end 40 of the tubular member 37 is provided with a threaded nut 41 which is connected with a threaded, mating fitting 42. The supply tube 34 illustrated in FIG. 1, includes a pressure gauge 43, an automatic pressure release valve 44, and a shut-off valve 45 connected adjacent the second end 36 thereof between the source of pressurized fluid and the plug 1. The valve 45 provides the user with means for controlling the inflation and deflation of the plug distensible portion 4. The pressure gauge 43 allows the user to selectively apply and maintain a certain fluid pressure in the distensible portion for secure sealing, and the relief valve 44 automatically prevents pressure build-up in the distensible member above a predetermined amount, thereby preventing rupture of the same due to excess pressure or overinflation.

The vent tube 6 is an elongate structure which communicates the fluid 10 which is carried in the conduit 2 with the environment at a location remote from the conduit open end 9. This communication prevents leakage of the fluids in the vicinity of the open end 9, as well as prevents exposing the workmen and/or their associated tools gear to the fluid. The vent tube 6 preferably flexible and resilient to facilitate placement of the plug, and is constructed of a material such as a polymeric resin or the like, which is resistant to chemical reaction and deterioration from exposure to the fluid. The illustrated vent tube 6 is particularly adapted to carry or transmit gaseous fluids therein, and is of a selected length sufficient to carry excess gases to an area so remote from the conduit open end 9 and work vicinity, that the vapors will not create a hazard of either explosion or poisoning at the work site. The free end 8 of the tube may be connected with a closed receiving tank or chamber (not shown) for collecting the excess gases and preventing their release into the environment.

Figure 2:
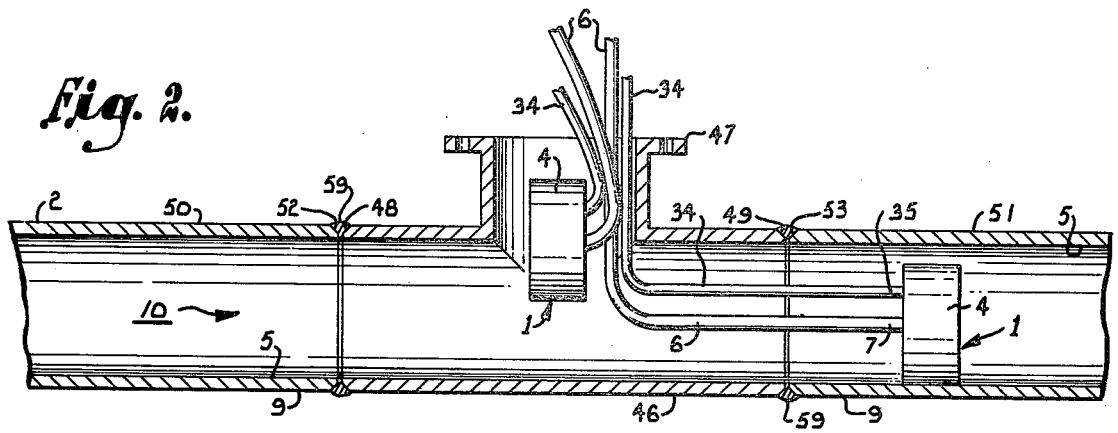
FIG. 2 is a partially schematic view of the plugging device shown in a deflated condition with one member thereof being withdrawn from a fitting member installed in the fluid conduit.

The pipe plug 1 is particularly adapted for use in conjunction with the installation of a fitting 46 in an existing conduit 2 for gaseous fluids. The fitting 46 may be an elbow, a Y or any one of a variety of well known configurations, and in the structure illustrated in FIGS. 1 and 2, is a T having a flanged end 47, and a pair of opposing, chamfered ends 48 and 49 (FIG. 1). Although the pipe plugging arrangement illustrated in FIGS. 1 and 2 shows a T fitting installed in a medial portion of the conduit 2, it is to be understood that the present invention is equally well adapted for use in installing a fitting, such as an elbow, at a terminal end portion of the conduit. In the illustrated example, the conduit 2 is first cut or severed at two spaced apart points thereby forming upstream and downstream conduit segments 50 and 51 respectively. For ease of description, it shall be assumed that the fluid flows in the direction of the illustrated arrow (FIGS. 1 and 2) from the reader's left to right. However, it is to be understood, that the present invention is equally applicable and adaptable for fluid flow in the opposite direction. If the conduit 2 is carrying a flammable or combustible material, the cut is preferably made by means which will not create a spark or otherwise ignite the gas, such as with a tube cutter or the like. The offal segment (not shown) which is severed from the conduit is removed from inbetween the free ends 52 and 53 (FIG. 1) respectively of the upstream and downstream segments of the pipe. A pair of plugs 1 are then threaded through the opening at the flanged end 47 of the fitting, and are directed through the opposing ends 48 and 49 of the fitting 46 into the upstream and downstream conduit segments 50 and 51 respectively. Each of the plugs 1 is positioned laterally in the associated pipe segment adjacent to the cut end thereof. The vent tube 6 and supply tube 34 of each of the plugs 1 extends through the opening in the flanged end 47 of the fitting 46. Each of the supply tubes 34 is then connected with a source of pressurized fluid, such as water, air, carbondioxide, or the like, and in the illustrated example, the free ends 36 of each of the supply tubes are interconnected by a Tee fitting 57, which communicates through a single tube segment 58 with the pressurized fluid. The pressure gauge 43, pressure relief valve 44, and shut-off valve 45 are sequentially mounted in each of the pipes for accurate and selective control of the pressure supplied to the distensible portion for the plug 1. Each of the valves 45 is opened, and the plugs are pressurized, thereby radially expanding each of the distensible members 4 into a sealing, abutting engagement with the interior surface 5 of the associated conduit segment. The free end 8 of each of the vent tubes 6 is then positioned at a location remote to the fitting 46 and conduit free ends 50 and 51, whereby the gaseous fluid 10 disposed in the upstream and downstream conduit segments 50 and 51 is in communication with the environment at the remote location. A pressure buildup in either of the conduit segments as a result of leaking valves and/or thermal expansion of the gases, causes a portion of said gases to flow through the vent tube 8 to the remote location until such time as the pressure in the pipe and the atmosphere is equalized. The fitting ends 48 and 49 are then securely fastened to the free ends 52 and 53 respectively of the upstream and downstream conduit segments, by means such as the illustrated welds 59. Because the vent tubes 6 prevent gas pressure buildup which can cause leakage about the distensible portion, the user may employ open flame welding to join the fitting with the conduit ends, and may work in the vicinity of the cut ends without fear of being exposed to the gases in the conduit. Preferably, the fitting is aligned, and tack welded in place prior to the welding of the entire seam. After the fitting ends have been welded, the valves 45 are then manipulated to depressurize each of the plugs 1, such as illustrated in FIG. 2. Inasmuch as the distensible portions 4 of the plugs are resilient, depressurization causes the same to automatically deflate and return to their reduced, initial size and shape. The plugs 1 are then towingly pulled by the tubes 6 and 34 through the fitting 46 to the open end of the flange 47, as illustrated in FIG. 2. Preferably, the plugs 1 are removed one at a time so as to prevent interference between the two plugs during their removal from the conduit. A corresponding, flanged conduit segment (not shown) is then connected with the flanged end 47 of the fitting 46, and the installation is complete.

It is to be understood that while I have illustrated and described certain forms of my invention, it is not to be limited to the specific forms or arrangement of parts herein described and shown.

What is claimed and desired to secure by Letters Patent is:

1. A method for installing a fitting in a conduit for hazardous gases, said method comprising:
   (a) severing said conduit at a point thereon, thereby forming upstream and downstream conduit segments;
   (b) providing a distensible temporary plug having a vent tube and a supply tube connected therewith;
   (c) inserting said distensible plug in a central aperture portion of said upstream segment; said vent and supply tubes being threaded through said fitting;
   (d) connecting said supply line to a source of pressurized fluid;
   (e) pressurizing said distensible plug, whereby an expansible marginal portion of said plug abuts and seals against an inside surface of said upstream conduit segment;
   (f) positioning a free end of said vent tube at a location remote to said severing point and communicating said upstream conduit segment with said remote location, whereby said hazardous gases are transmitted through said vent tube to the atmosphere at said remote location to prevent leakage about said expansible marginal portion and consequent exposure to persons in the vicinity of said severing point;
   (g) connecting said fitting to the upstream segment of said conduit while said vent tube is communicating the upstream conduit segment with said remote location;
   (h) depressurizing said distensible plug; and
   (i) withdrawing said plug from said conduit by towingly pulling the same through said conduit upstream segment and said fitting.

2. A method as set forth in claim 1 wherein:
   (a) said conduit transmits a flammable gas;
   (b) said fitting is connected to said conduit by welding.

3. A method as set forth in claim 1 wherein:
   (a) said fitting is a T-joint for installation in a medial portion of said conduit; said T-joint having a flanged end;
   (b) said conduit is severed at first at second spaced apart points whereby an offal portion having a length commensurate with said T-joint is removed therefrom;
   (c) first and second plugs are inserted and pressurized in the upstream and downstream segments of said conduit respectively; and
   (d) said first and second plugs are withdrawn from said conduit through the flanged end of said T-joint.

4. A method as set forth in claim 1 including:
   (a) automatically releasing excess supply pressure to said plugs to prevent damage thereto.

5. A method as set forth in claim 1 wherein
   (a) said fitting includes a beveled end edge; and including
   (b) welding said fitting end edge directly to said upstream conduit segment.

6. A method as set forth in claim 1 wherein:
   (a) said fitting is a three-ended joint for installation in a medial portion of said conduit; said three-ended joint having first and second aligned ends, and a third end; and including
   (d) severing said conduit at first and second spaced apart points, whereby an offal portion having a length commensurate with said three-ended joint is removed therefrom;
   (c) threading said first and second plugs through said three-ended joint and inserting and pressurizing the same in the upstream and downstream segments of said conduit respectively;
   (d) welding said first and second fitting ends directly to the severed conduit ends; and
   (e) depressurizing said first and second plugs and withdrawing the same from said conduit through the fitting third end.

7. A temporary plug for insertion into an open end of a conduit for hazardous gases, said plug comprising:
   (a) an imperforate body having a fluid tight distensible portion connected with said body arranged to be enlarged by introduction of fluid therein and having a marginal surface thereof adapted to abut and seal against an inside surface of the open end of said conduit for plugging the same;
   (b) means for selectively introducing pressurized fluid into said collar; and
   (c) an elongate, flexible vent tube having a first end thereof connected with said body, and a second end thereof disposed at a location remote from the open end of said conduit; said vent tube communicating said hazardous gases with the atmosphere at said remote location to prevent leakage of said hazardous gases about said plug and consequent exposure to persons in the vicinity of said conduit open end;
   (d) an elongate supply tube having first and second ends; said supply tube first end being connected with said body and communicating with said distensible portion, and said supply tube second end being connected with said pressurized fluid means; and wherein (e) said body comprises a pair of spaced apart side walls having a circularly shaped periphery on which said distensible portion is mounted; said side walls and said distensible portion forming a cavity thereinbetween which communicates with said supply tube second end;

(f) said side walls each having an annularly shaped flange attached to the periphery thereof which extends outwardly therefrom; said flange of each side wall having a radially interior and exterior surface;

(g) said distensible member comprises a cylindrically shaped segment of flexible and resilient material having a medial portion, and inwardly turned ends attached to an associated flange interior surface, whereby said pressurized fluid radially expands the medial portion of said material; and (h) said body includes a tubular fitting disposed laterally between said side walls and is rigidly attached thereto for retaining the same in a parallel and spaced apart relation; said fitting having a first end thereof communicating with said hazardous gases, and a second end thereof communicatively connected with the vent tube first end and positioned outwardly toward the open end of said conduit.

8. An apparatus as set forth in claim 7 including:

(a) pressure relief means connected with said supply tube and releasing said hazardous gases to the atmosphere in response to excess pressures in said supply tube above a predetermined amount.

* * * * *